Dec. 26, 1961     R. H. KRESS     3,014,739
VEHICLE SHOCK-ABSORBING COUPLING
Filed Nov. 28, 1958     5 Sheets-Sheet 1
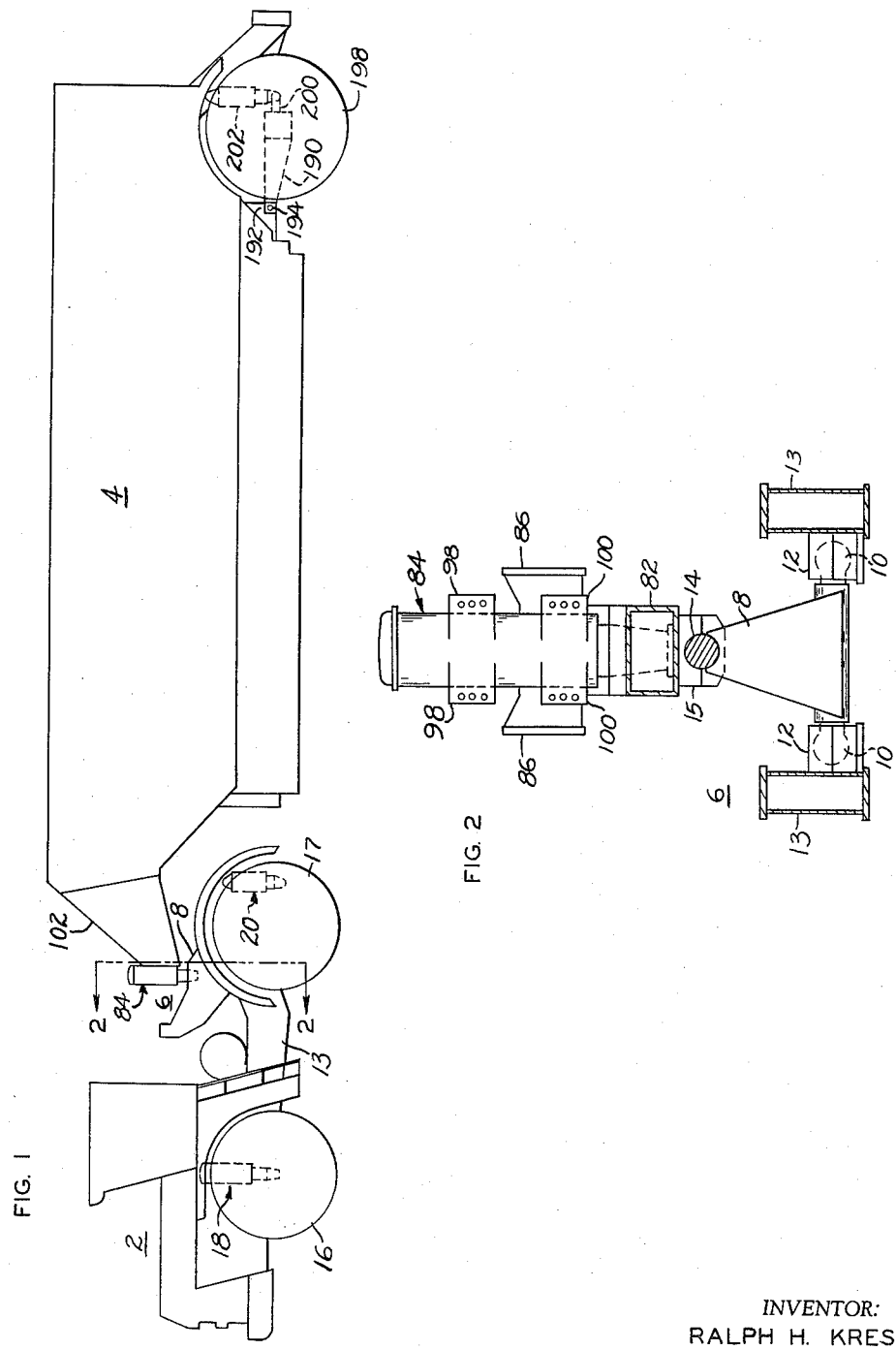
INVENTOR:
RALPH H. KRESS
BY John F. Schmidt
ATTORNEY

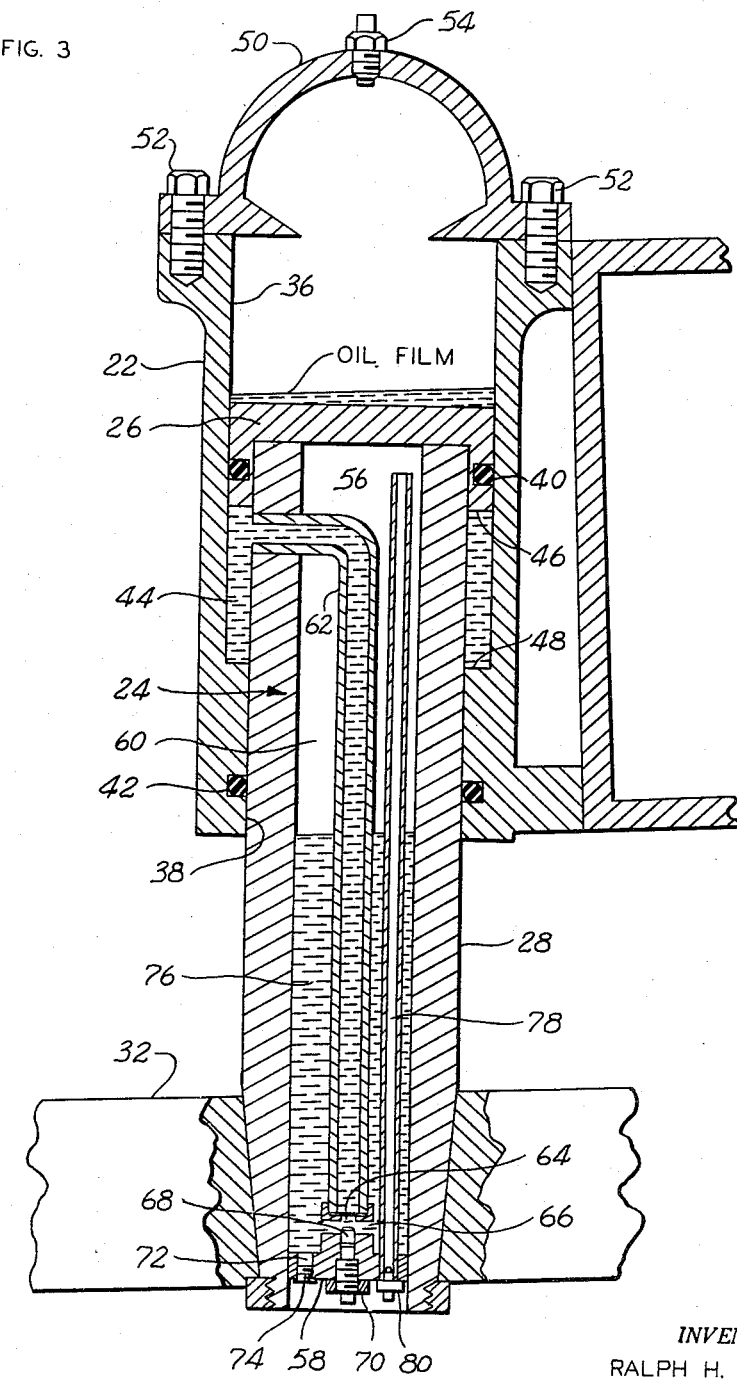

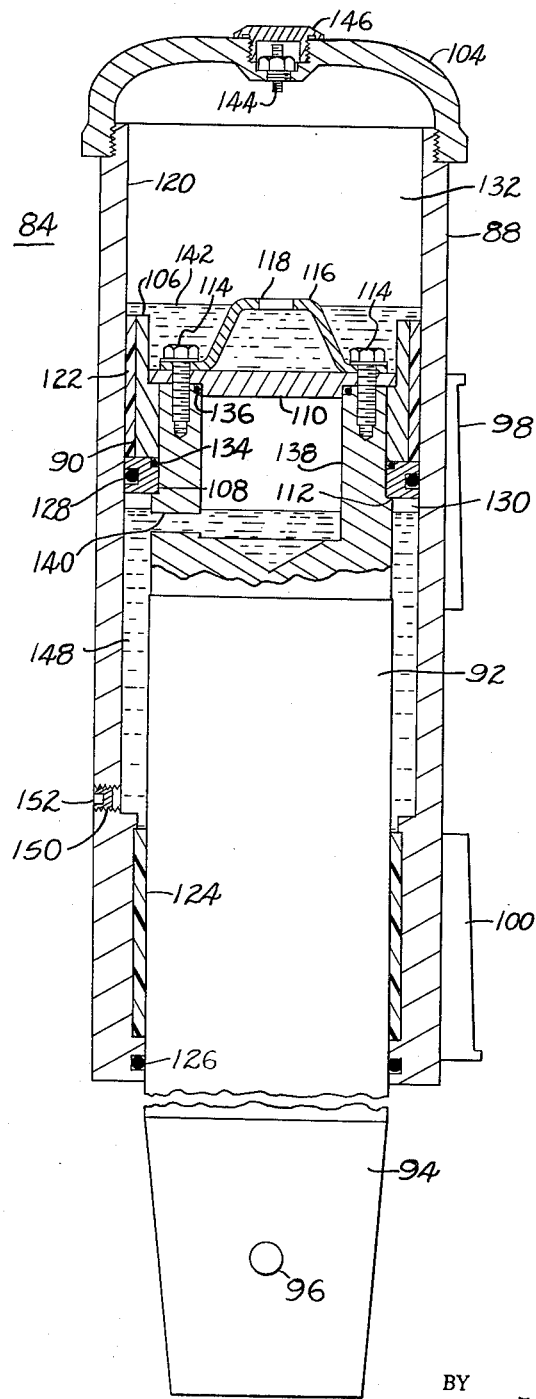

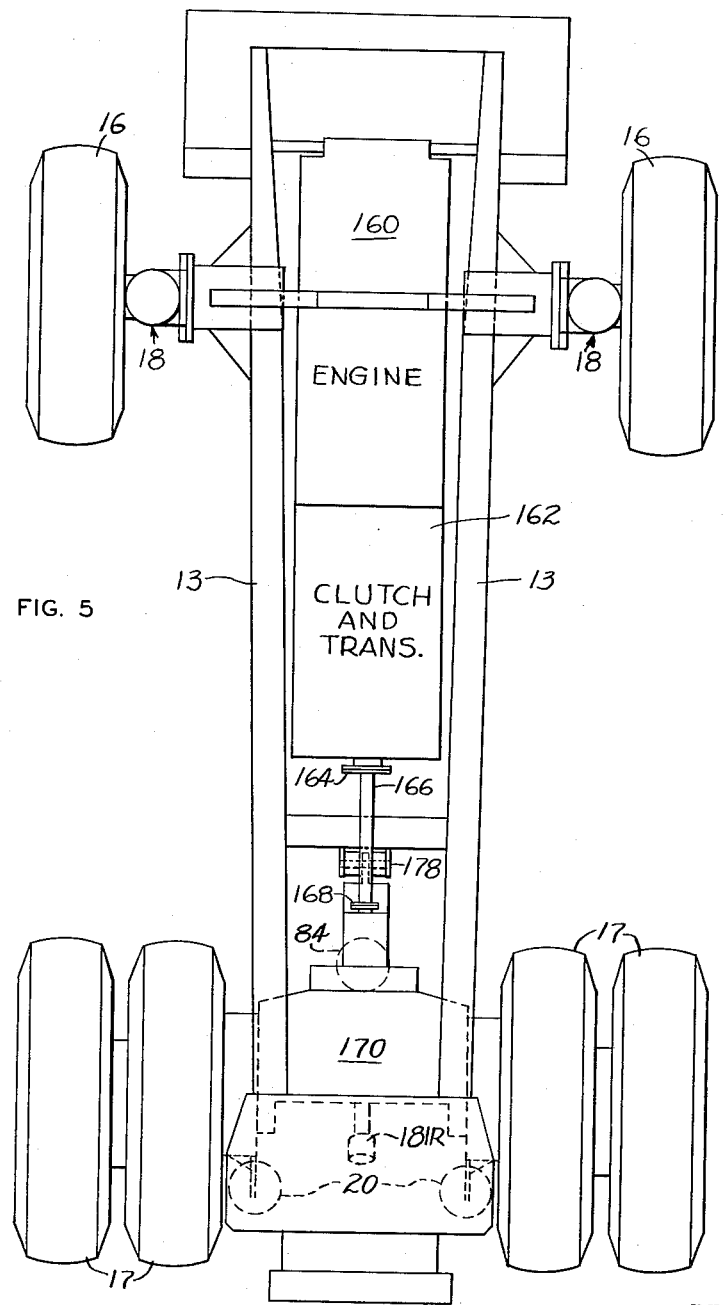

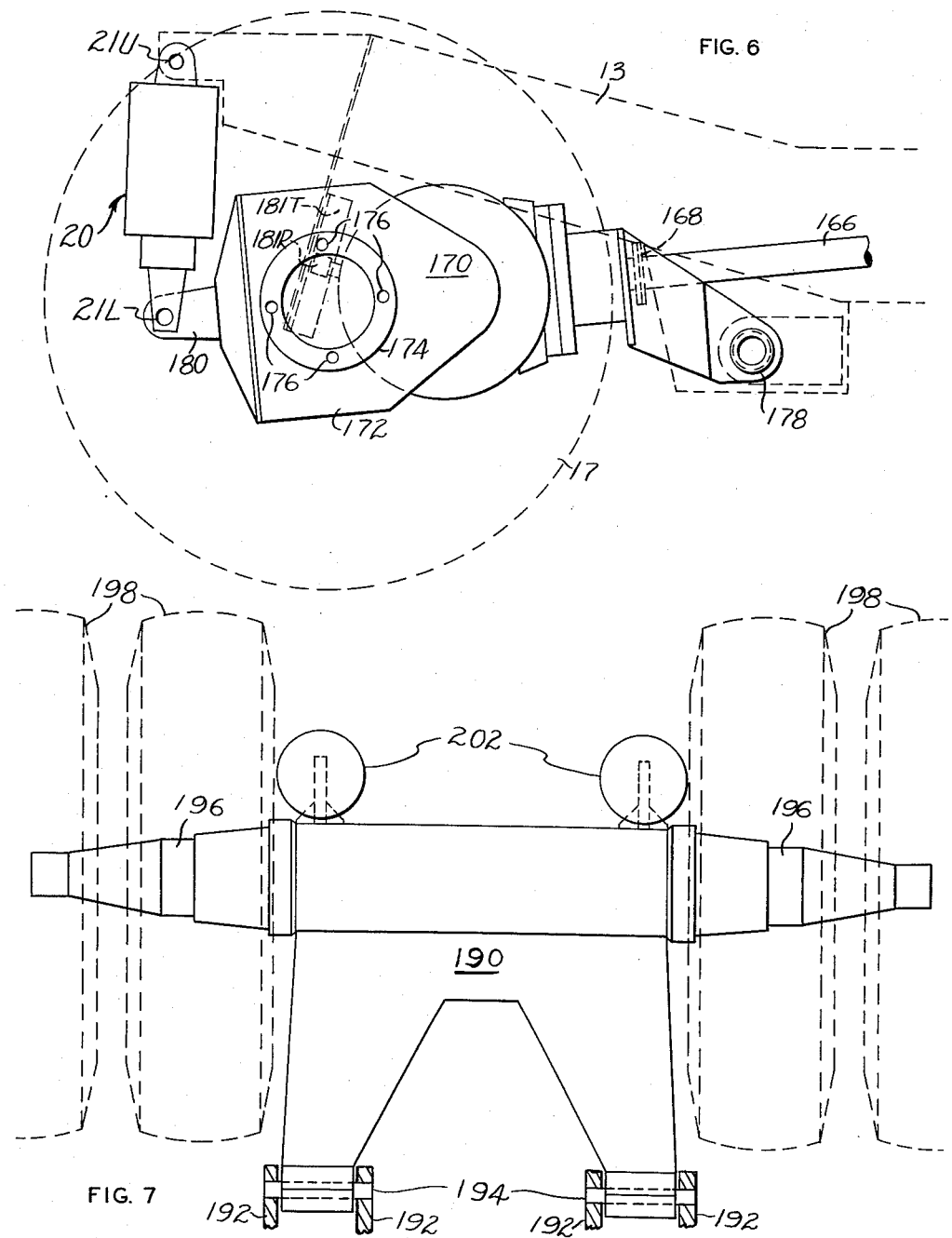

United States Patent Office 3,014,739
Patented Dec. 26, 1961

3,014,739
VEHICLE SHOCK-ABSORBING COUPLING
Ralph H. Kress, Peoria, Ill., assignor to LeTourneau-Westinghouse Company, Peoria, Ill., a corporation of Illinois
Filed Nov. 28, 1958, Ser. No. 777,070
5 Claims. (Cl. 280—489)

This invention relates to vehicles generally. More particularly, the invention relates in part to automotive vehicles, in part to trailing vehicles, and in part to a train comprising a towing vehicle and a trailing vehicle.

Although the advantages of the various aspects of this invention are capable of application to vehicles generally, they are probably realized to their fullest extent in vehicles of the off-highway type. Off-highway vehicles are required to negotiate difficult terrain and are necessarily subject to greater shocks due to unevenness of the terrain encountered by the vehicle. The shocks referred to result in tremendous shock loading of the wheel suspension means of such vehicles; furthermore, in the train type of vehicle in which one element of the train is supported on an adjacent element, the uneven terrain encountered subjects the support means coupling the two elements together to tremendous shock loads. Furthermore, where the train includes an element which is to be shovel-loaded, there is a further shock loading of the wheel suspension elements and the coupling means, because there are in use today power operated shovels employing dippers of tremendous capacities which are capable of dropping many tons of ore, earth, rock, and the like at one time into the receiving element of the train. The shock loading incidental to such operations subjects the structural members of the vehicle or vehicles to tremendous repetitive stresses. The repetitive stresses encountered in shovel loading and in negotiating rough terrain result in early failure of conventional wheel suspension means and train coupling devices, with the further result of high maintenance costs, extensive down-time of costly equipment, idle high-cost labor, inconvenience, inability to meet delivery schedules, and so forth.

In view of the foregoing, it is one object of this invention to provide wheel suspension means and train coupling devices which will materially reduce unsprung weight and shock loading of the structural elements involved. This and other objects are accomplished in a combination of wheel suspension and coupling devices and mounting means for these devices, in which the devices are piston-and-cylinder expansible chamber devices. Other objects will be apparent to those skilled in the art from a consideration of the following description and the appended drawings.

In the drawings:

FIG. 1 is a schematic, largely outline, drawing of a two-vehicle train showing the location of the wheel suspension means and the coupling means by which one vehicle is partially supported on the other.

FIG. 2 is a view in section substantially on line 2—2 of FIG. 1, on a larger scale than FIG. 1.

FIG. 3 is a longitudinal sectional view through one of the expansible chamber wheel suspension devices, also on a much larger scale than FIG. 1.

FIG. 4 is a longitudinal sectional view through the expansible chamber coupling device shown in FIG. 2, but on a much larger scale than FIG. 2.

FIG. 5 is a top plan view, partially schematic, showing the tractor chassis, the wheel suspension devices thereof, the final drive housing and its relationship to the wheel suspension devices, and illustrating in phantom the location of the expansible chamber coupling device and its relationship to the tractor.

FIG. 6 is a side elevation view of the tractor final drive housing and expansible chamber devices, showing the relationship of this combination of elements to other structural members of the tractor; and FIG. 7 is a top plan view of the suspension mechanism for the rear wheels of the trailing element of the train.

Referring now in detail to the figures, FIG. 1 shows a train consisting of a tractor indicated generally at 2 and a trailer 4. The tractor supports the front end of the trailer by means of a coupling indicated generally at 6. Coupling 6 includes a saddle 8 mounted on the tractor portion of the train. The saddle 8 is mounted to be pivotable about a horizontal, transverse, axis, this axis being provided by balls 10 secured to the saddle and carried in sockets 12 which are suitably mounted on frame members 13. At the upper end of saddle 8, there is provided a longitudinal member 14 which has other balls at its ends similar to the balls 10 which are located in sockets, one of these being shown at 15.

The tractor or lead vehicle 2 is provided with wheels 16 and 17; the forward wheels 16 are the dirigible wheels in the embodiment shown, and the wheels 17 are the drive wheels.

The wheels are carried on the vehicle by means of wheel suspensions indicated generally at 18 and 20. As will be explained in greater detail below, each wheel suspension is an expansible chamber device having a cylinder assembly 22 and a piston assembly 24 (FIG. 3), piston assembly 24 including a piston 26 and a piston rod 28. One of the two assemblies of the expansible chamber device is secured to the vehicle frame, and a dirigible wheel is mounted on the other assembly. Thus, in the embodiment shown in FIGS. 1 and 3, the cylinder assembly 22 is secured to frame 13 by means of a suitable mounting bracket, and dirigible wheel 16 is mounted on the piston assembly 24, assembly 24 being pivotable relative to assembly 22 to permit steering of the vehicle. Toward this end, a steering arm (not shown) is provided as an integral part of the wheel axle 32.

Referring now in detail to FIG. 3, it can be seen that cylinder assembly 22 is provided with a large bore 36 and a smaller bore 38. The large bore 36 accommodates piston 26, piston 26 being provided with suitable packing means, as for example the O-ring 40. The small bore 38 accommodates the piston rod 28, and the portion of cylinder assembly 22 in which bore 38 is formed is also provided with suitable packing means, shown here as an O-ring 42. Thus, the piston assembly and the cylinder assembly define an annular space 44, this being the space between the lower face 46 of piston 26 and the shoulder 48, and the bore 36 and the piston rod 28.

Cylinder assembly 22 is provided with a cylinder head 50, head 50 being secured to the cylinder in any suitable manner, as by capscrews 52. Cylinder head 50 is provided with a charging valve 54 which may be any one of a number of commercially available check valves permitting fluid to flow under pressure in one direction only and being manually releasable to permit fluid flow in the opposite direction.

The space above piston 26 is charged with a dry compressible fluid at a substantial pressure. By "substantial" is meant several atmospheres. Precisely what the pressure needs to be is a design detail to be worked out by those skilled in the art. It suffices to note here that the pressure must be enough to support the load, plus enough to offset the pressure in the opposing chamber below the piston.

In a preferred embodiment of the invention, piston assembly 24 is hollow. In the embodiment shown in FIG. 3, this hollow consists of a bore 56 in the piston rod 28. Bore 56 is closed at its upper end by piston 26, and at its lower end by a closure 58 which is here shown as welded to piston rod 28. The bore 56, closed at its ends as aforesaid, thus provides a reservoir 60.

Conduit means are provided to connect annular space 44 with the reservoir 60. In the embodiment shown, suitable piping 62 passes through an opening in the piston rod 28, this opening being preferably just below the lower face 46 of piston 26. Piping 62 is secured at its lower end in the closure 58 and communicates with an axial bore 64 which in turn is intersected by a transverse bore 66. Any suitable needle valve 68 may be provided in the lower end of bore 64 which is suitably threaded for the purpose. A lock nut 70 is preferably provided to hold the needle valve 68 in place.

Closure 58 is provided with still another bore 72 which is fitted with a plug 74 to permit charging the reservoir with an incompressible fluid shown at 76. Inasmuch as the preferred embodiment of the invention is intended to employ a combination of a compressible fluid and an incompressible fluid, closure member 58 is fitted with a conduit 78 which is long enough to extend at all times above the level of incompressible fluid in the reservoir 60. At its lower end, conduit 78 is fitted with a suitable gas charging valve 80, similar in principle to the valve 54, discussed above.

The invention shown in FIG. 3 is disclosed and claimed in my Patent 2,914,337, issued November 24, 1959.

Referring now to FIGS. 2 and 4, it will be seen that the coupling 6 includes a longitudinal member 82 which carries an expansible chamber device 84. Forward of the device 84 there are provided stops 86 which engage the side of the trailing element during sharp turns and limit the pivoting of trailing element 4 relative to tractor element 2.

Expansible chamber device 84 is best seen in detail in FIG. 4. As there seen the device comprises a cylinder assembly 88 and a piston assembly 90. Piston assembly 90 is mounted on, and in part includes, a piston rod 92, the lower end of which is preferably in the form of a truncated cone 94 having an opening 96 therein to receive a suitable setscrew forming part of the means to hold the piston assembly 90 and its connected piston rod 92 secure relative to the tractor 2. In the embodiment shown, the piston assembly is secured to the tractor 2 in any suitable manner, while the cylinder assembly 88 is secured to the trailer 4. Toward that end, mounting pads 98 and 100 are provided on the cylinder. Pads 98 and 100 are engaged by a suitable hitch member provided at the forward face of neck 102 on trailer 4.

The expansible chamber devices shown in FIGS. 3 and 4 differ slightly as to certain details. However, it should be understood that these detailed differences are not essential and that a large part of the advantages of the invention could be realized if the devices of these two different applications were substantially identical. In the device shown in FIG. 4, cylinder head 104 is screwed on to the upper end of the cylinder instead of being bolted on as in FIG. 3. In the embodiment shown in FIG. 4, the piston assembly 90 is fabricated of a greater number of parts than the corresponding piston assembly shown in FIG. 3. Thus, in FIG. 4, two metal rings 106 and 108 are secured between a piston head 110 and a shoulder 112, shoulder 112 being provided on the piston rod 92, and piston head 110 being secured to the piston rod by threaded members 114.

A cup-shaped member 116 is also held in place by threaded members 114 and is provided with a centrally disposed opening 118. The cup-shaped member 116 permits lifting of the piston assembly from the cylinder head end, for which purpose access to member 116 may be provided by removal of cylinder head 104.

Metal ring 106 referred to above is substantially smaller than the inside diameter of bore 120 of cylinder 88. The annular space between ring 106 and the inner walls of the cylinder provided by bore 120 is preferably filled by a sleeve 122. Sleeve 122 is preferably made of a suitable fabric like cotton impregnated with a phenolic resin. The sleeve 122 serves the purpose of providing a better bearing material than would be provided by a metal member of like proportions. A similar ring 124 is preferably provided at the lower end of the cylinder and engages piston rod 92.

Suitable packing is provided where needed. Thus, a conventional O-ring 126 is provided in a suitable groove near the lower end of cylinder 88. An O-ring 128 is provided in a groove in the outer cylindrical surface of ring 108 and serves to seal annular space 130 from the space 132 above the piston. O-rings 134 and 136 are additionally provided to seal the assembly against possible leaks along the various joints formed by the several parts of the fabricated piston 90.

Piston rod 92 is provided at its upper end with a centrally disposed bore 138; bore 138 communicates with annular space 130 by means of a passage 140 in the piston rod.

A quantity of oil 142 above the piston assembly 90 provides suitable lubrication for the piston as it reciprocates along and oscillates about a substantially vertical axis relative to the cylinder. The space 132 above the oil is charged with a compressible fluid at a substantial pressure. Provision for control of the fluid pressure is made by charging valve 144 which serves the same purpose in the device shown in FIG. 4 as charging valve 54 serves in the device shown in FIG. 3. In FIG. 4, charging valve 144 is provided in a recess in the cylinder head 104 and is protected by a cap or plug 146 threaded into the recess.

Reference was made above to the fact that space 132 is charged with compressible fluid at a "substantial" pressure. By the word "substantial" is meant a pressure of several atmospheres. Precisely what this pressure need be need not be determined here. The exact pressure is a design problem and can be determined by a competent man skilled in the art who takes all of the factors into consideration. Obviously, the pressure must be sufficient to sustain the weight of the forward end of the trailer in its fully loaded condition. Furthermore, inasmuch as the space 130 below the piston forms a pressure chamber which is opposed to the pressure chamber formed by the space 132, it is obvious that the pressure in chamber 132 must be enough to sustain the trailer load referred to plus enough to offset the pressure in the pressure chamber 130.

The pressure chamber 130 is of course in communication with the centrally disposed bore 138 of the piston rod. With the parts in the relative positions shown in FIG. 4, the annular space 130 is shown as being largely filled with an incompressible fluid 148, preferably oil. The space above the oil is charged with a compressible fluid. Access to the annular space 130 and the connected hollow of the piston rod is provided by bore 150 in the cylinder 88, bore 150 being sealed with a plug 152.

The compressible fluid used on both sides of the piston may be any suitable, relatively inert, gas such as dry nitrogen.

As can be seen from FIGS. 1, 2, and 4, the pivot axis of device 84 is substantially vertical when the train is on a horizontal plane. As a result, upward movement of the piston assembly relative to the cylinder assembly permits easy gravitational flow of oil out of bore 138 into space 130 via passage 140 under the influence of pressure in bore 138. On the return or rebound stroke, oil flows back into bore 138 via passage 140 under the influence of pressure in space 130, the pressure increasing because of the diminution in volume of space 130.

Reference will now be made to FIGS. 5 and 6 for a discussion in detail of the final drive assembly and its relationship to the rest of the structure. In FIG. 6 the frame member 13 and drive wheel 17 are shown in phantom in order not to obscure certain details of the invention.

In FIG. 5, any suitable engine or power plant 160 is shown schematically. Any suitable clutch and transmission assembly 162 may be provided behind the engine. The transmission is shown as having an output power connection 164. A drive shaft 166 is connected with the output power connection 164 and an input power connection 168 of a final drive assembly indicated generally at 170.

The details of the power train included in the final drive assembly are not disclosed here because those details are not claimed. It will suffice to say that the power train of the final drive assembly may be any suitable train of gears, including some satisfactory differential. The power train is enclosed in a final drive housing 172 which serves as a basic supporting structure for the final drive. As aforesaid, power input connection 168 is shown and may be considered a part of the final drive assembly. Similarly, power output connections for the final drive assembly are provided, and one of these is shown in FIG. 6 at 174; there is of course another such power output connection on the opposite side of the final drive assembly. The drive wheels may be secured to the power output connection 174 in any suitable manner, as for example by being bolted thereto through a suitable number of openings provided for that purpose, four of which are shown at 176 in FIG. 6. It will be understood by those skilled in the art that suitable brakes may be provided. Such items are standard and will therefore not be shown here.

The final drive housing is secured to the vehicle frame by a suitable universal (ball and socket) type of mounting, here indicated generally at 178. The final drive housing is thus secured to the vehicle frame at a point closely adjacent to the power input connection 168. As is best seen in FIG. 6, drive shaft 166 is above the universal connection 178, which means of course that the pivot axis of the final drive assembly is not coincident with the axis of shaft 166 and connection 168. This presents no difficulty because connections 164 and 168 are preferably of the universal joint type and are able to accommodate such misalignment of the axes of connections 164 and 168 as will occur due to the offset relationship of mounting connection 178.

At its rear end, final drive housing 172 is provided with rearwardly extending ears, one of which is shown at 180 in FIG. 6. The two piston-and-cylinder expansible chamber suspension means 20 for the rear wheels are secured between the ears 180 of final drive housing 172 and suitable mounting brackets at the ends of frame 13. In order to maintain suitable alignment in a vertical plane as the housing 172 swings up and down about the universal mounting 178, some suitable guide means are provided. For example a roller 181R is provided at the rear of final drive housing 172, the roller to operate in a suitably located track 181T.

Reference will now be made to FIGS. 1 and 7, and especially to FIG. 7, for a fuller description and understanding of the trailer suspension. At this point, it may be well to indicate that the trailing element 4 may be constructed according to any of a number of conventional patterns. It would, for example, be possible to construct the trailing element 4 with a frame to which a carrying body having bottom dump doors could be bolted. In the preferred embodiment of the invention as actually practiced, trailing element 4 has been built by the method known in the art as unit construction. Thus, there is no separately identifiable frame as such.

At the rear end of the unit construction referred to, a rigid sub-frame indicated generally at 190 is mounted to pivot about a substantially transverse axis. More specifically, suitable structural elements 192 secured to the unit construction are provided. Pins 194 are carried in suitable openings in the elements 192; the axes of pins 194 are substantially coincident and provide the transverse pivot axis for sub-frame 190. At its opposite sides, sub-frame 190 carries wheel axles 196, and wheels 198 are rotatably mounted on the axles 196. The wheels 198 are shown in phantom in FIG. 7 in order not to obscure other elements of the invention.

At its rear end, sub-frame 190 is provided with suitable mounting ears 200. Piston-and-cylinder type expansible chamber devices 202 are secured between the mounting ears 200 and suitable mounting brackets provided on the unit construction. The devices 202 are preferably of the type shown in FIG. 3, although certain details of the device shown in FIG. 4 may be embodied in the devices 202. For example, the cylinder head of the device shown in FIG. 4 might be used in place of the cylinder head illustrated in the device shown in FIG. 3. Also, phenolic resin liners such as are shown at 124 and 122 in FIG. 4 might be used. Thirdly, a fabricated piston assembly of the type shown at 90 could be used if desired instead of the simpler form of piston shown in the FIG. 3 device.

Operation

Reference will be made first to FIG. 3 for a discussion in detail of the operation of the aspect of the invention there shown. It may be pointed out here that steering of the vehicle and operation of the wheel suspension device during steering and otherwise are described in my above-identified Patent 2,914,337. The pressure chamber defined by bore 36, cylinder head 50, and the upper face of piston 26 is charged to the desired pressure with a compressible, preferably dry, fluid, as aforesaid. A preferred fluid is nitrogen, although of course air can also be used. A thin film of oil is preferably provided on top of piston 26 and serves a dual purpose, namely lubrication and the prevention of metal to metal contact at the upper limits of the stroke of piston 26. The annular space 44 is charged with an incompressible fluid, such as oil, and a pool of oil 76 is provided in the reservoir 60. The annular space 44 is kept in communication with the pool of oil 76 by means of the conduit 62. Oil can be added to or taken from the reservoir by removing plug 74. The space above the pool of oil in the reservoir is preferably charged with the same kind of compressible fluid as is used above the piston. The pressure of this compressible fluid can be controlled through the charging valve 80 and conduit 78.

As wheel 16 (or 17 or 198) strikes a "bump" in its path, it moves upward, substantially vertically, in relation to the basic supporting structure of the vehicle. The shock of the sudden upward movement is absorbed by compression of the compressible fluid in the pressure chamber above the piston.

In the meantime, it must be remembered that there is a second pressure chamber opposed to the pressure chamber above the piston, this being the pressure chamber formed by the annular space 44. As piston 26 moves upward, the volume of annular space 44 increases. Cavitation of the incompressible fluid in this space is substantially prevented by the flow of fluid from the reservoir 60 through passages 66 and 64, and conduit 62, into the annular space 44. However, even if oil cannot flow through these passages quickly enough to prevent cavitation entirely, there is no appreciable interference by such cavitation with the upward movement of piston 26. It will of course be recalled that the space above the pool of oil 76 in reservoir 60 is also charged with fluid under a substantial pressure. Accordingly, the oil in the pool 76 tends to "follow" the upward movement of piston 26 quite closely.

As the wheel rides off the "bump," the pressure in the chamber above the piston attempts to restore the piston to its original position. However, as piston 26 begins to move downward in relation to cylinder 22, it encounters the substantially incompressible fluid in the annular space 44; piston 26 cannot move downward without displacing oil from the space 44 into the reservoir 60 by way of conduit 62 and passages 64 and 66. In moving through passages 64 and 66, the oil must flow through the variable restriction provided by needle valve 68. Thus, the fact that oil must be displaced from the annular chamber or space 44, and the fact that resistance to such movement is offered both by the needle valve and the pressure of the gas above the pool 76—both of these conditions serve to retard the flow of oil to some extent and give a shock absorber action to the suspension. The rate of flow of oil through the conduit 62 can of course be varied by varying the position of needle valve 68.

The action of the suspension when the wheel encounters a hole in its path is of course similar to the action described above when the wheel rides off a bump. In this connection, however, it should be remembered that the pressure of the compressible fluid in reservoir 60 is desirably such as to prevent a complete displacement of incompressible fluid or oil from the annular chamber 44; in this way, the suspension avoids metal to metal contact between the surfaces 46 and 48 in the lower limits of the stroke of the piston.

To steer the vehicle, the dirigible wheels 16 are steered by means of suitable steering linkage. Steering is accomplished by turning the dirigible wheels about the axes of their expansible chamber devices. More specifically, the piston assembly turns inside the cylinder assembly about their common axis. This turning or pivoting motion in no way interferes with the functioning of the suspension as means to absorb road shock.

The operation of device 84 (FIG. 4) which forms part of the coupling means of the two-vehicle train, and by which one of the train elements is partially supported on the other, will now be discussed. It will be remembered that, in the embodiment shown, the piston assembly is carried by the tractor and the cylinder assembly is mounted on the trailer.

Let it be assumed now that the tractor rear wheels hit a substantial obstruction, such that an unsprung hitch would severely jar the forward end of a heaped, heavily loaded trailer and would spill much of the load, as well as stress certain structural members near to or beyond their breaking point. Piston 90 will receive a sudden upward impulse, and it will be aided in this movement by the pressure in annular space 130. Such movement will be opposed by the pressure in chamber 132. There will be some movement of the piston upward relative to the cylinder, and it will further compress the fluid in space 132; the impact shock will be absorbed by the increase in pressure in chamber 132.

Meanwhile, the volume of space 130 is increasing, permitting expansion of the compressible fluid there. The hollow of the piston rod serves as a reservoir for incompressible fluid, which flows out of the hollow under the pressure of the compressible fluid, through the bore 140, into annular space 130.

On the rebound stroke, the piston moves downward relative to the cylinder but such movement is resisted by the necessity for displacing incompressible fluid 148 from the annular space. Since movement of the incompressible fluid offers more resistance than the mere compression of a compressible fluid would, there is a dampening effect imposed during the rebound stroke. Thus the device 84 is provided with integral rebound control means.

It may be noted that the advantages of the device 84 will also be realized during loading of the trailing element 4. The greatest shock would be imposed when the first dipperfull is dropped into an empty trailer. Such a load could weigh from eight to ten tons—or even more, in the case of some of the bigger shovels. A ten ton load dropped into the forward end of an empty trailer would probably fall from ten to 15 feet before striking the bottom of the trailer. The impact shock of such an operation can well be imagined. In the case of a solid pin coupling, the shock would have to be absorbed by the inertia of the train weight, by the wheel suspension (conventional springs, which are normally so stiff as to yield very little), and by flexing of the tires.

In a train made according to the invention, a great deal of the impact at the hitch or coupling end is absorbed by compression of the compressible fluid. This absorption of shock relieves the several structural members of a great deal of severe, jarring, shock which in conventional equipment results in early failure of many of the stressed parts.

The rebound control which forms an integral part of device 84 and is discussed above presents another advantage which may be brought out here. A severely jolted elastic system of this type will normally pass through numerous cycles of vibration of slowly diminishing amplitude. The rapidly repeated cycles of vibration will jar much of a heaped load loose. While the percentage loss of payload is small, the accumulation of such spillage on the haulway can and often does present definite clean-up problems. It is for that reason, too, that the integral rebound control means of the device 84 presents substantial advantages over conventional couplings.

Referring now to FIGS. 5 and 6, it will be noted that a simultaneous rise and fall of both sides of the final drive housing will effect a simple pivoting of the housing about a transverse linear axis through the mounting 178— perpendicular to the plane of FIG. 6. However, in the rough terrain which off-highway equipment of this type must cover, such action is unusual. The more usual situation is one in which the movement of one side is unrelated to that of the other side, resulting in considerable twisting of the final drive housing 172 on its universal joint connection 178 with the vehicle frame.

In conventional suspensions, the "springs" would be so stiff and rigid as to permit very little movement of a wheel 17 relative to the frame, resulting in a very rough ride and necessitating a corresponding slow-down of the vehicle to prevent shaking the equipment to pieces.

To some extent, the hard ride of conventional suspensions is due to the fact that the springs must be stiff enough to maintain alignment of the drive train. The suspension devices 20 do not have to maintain alignment of the final drive assembly, because that is accomplished by the roller 181R and the track 181T. In fact, to assure that no sidewise thrust is taken by the devices 20, they are secured to frame 13 and to housing 172 by ball-and-socket connections 21U and 21L respectively. Another point, however, that makes conventional suspensions rather hard riding is their weight, which makes for more unsprung weight than in suspensions of the type here disclosed.

Reference will now be had to FIGS. 1, 2, and 7 for a discussion of the operation of this aspect of the invention. The transverse pivot axis provided by balls 10 permits pivoting of the trailer relative to the tractor in a vertical plane. The longitudinal pivot axis provided by member 14 allows longitudinal tilt of the trailer relative to the tractor where uneven terrain requires such accommodation. It should be pointed out that the rigid sub-frame 190 permits very little vertical movement of the wheels 198 on one side relative to the wheels 198 on the other side—as, for example, when a "bump" or a hole is encountered on only one side. What little individual wheel movement does take place is due to the slight flexibility of sub-frame 190 and to the twisting that may be permitted by the rubber bushings surrounding the pins 194.

The net effect of the rigid sub-frame 190 is a sway control of the very long and heavy (when loaded) trailer—a result which is not attained by conventional suspension devices except by the use of very complex and cumbersome mechanisms. However, even while control over sway is accomplished by the applicant's suspension, a soft ride is maintained by the oleo-pneumatic expansible chamber devices 202 and 84, resulting in much less wear and tear on the equipment.

It will be evident from the foregoing that this invention provides wheel suspension mechanisms and train coupling devices which permit operation of such equipment over rough terrain with a minimum of wear on the equipment and with maximum comfort for operators. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a tractor-trailer coupling: a cylinder assembly including a cylinder having an internal bore defining a path for reciprocation of a piston, and a head closing one end of the bore; a piston assembly in the cylinder bore including a solid piston rod having an external surface parallel to the direction of reciprocation and a bore in one end, a cap secured to said one end forming a closure for the piston rod bore, means spacing said surface from the cylinder bore to provide a cavity for fluid between the rod and the cylinder bore and to seal said cavity from a second cavity for fluid between the piston assembly and the head, and a passage adjacent the inner end of the piston rod bore connecting the piston rod bore with the first-named cavity; compressible and incompressible fluids in the first-named cavity; and a compressible fluid in the second cavity.

2. A coupling as in claim 1, in which the spacing means includes a sleeve of a bearing material.

3. In a tractor-trailer coupling: a cylinder assembly secured to the trailer in a substantially vertical position and including a cylinder having an internal bore defining a path for reciprocation of a piston and a pivot axis, and a head closing the upper end of the bore; a piston assembly mounted on the tractor and extending into the cylinder bore including a solid piston rod having an external surface parallel to the direction of reciprocation and a bore in its upper end, a cap secured to the upper end forming a closure for the piston rod bore, means spacing said surface from the cylinder bore to provide a cavity for fluid between the rod and the cylinder bore and to seal said cavity from a second cavity for fluid between the piston assembly and the head, and a passage adjacent the lower end of the piston rod bore connecting the piston rod bore with the first-named cavity; compressible and incompressible fluids in the first-named cavity and the piston rod bore; and a compressible fluid in the second cavity.

4. In a tractor-trailer coupling: a cylinder assembly secured to the trailer in a substantially vertical position and including a cylinder having an internal bore defining a path for reciprocation of a piston and a pivot axis, and a head closing the upper end of the bore; a piston assembly mounted on the tractor and extending into the cylinder bore including a solid piston rod having an external surface parallel to the direction of reciprocation and a bore in its upper end, means spacing said surface from the cylinder bore to provide a cavity for fluid between the rod and the cylinder bore and to seal said cavity from a second cavity for fluid between the piston assembly and the head, a cap secured to the upper end of the piston rod to close the upper end of the piston bore and engaging at least a portion of the spacing means to hold it in place, and a passage adjacent the lower end of the piston rod bore connecting the piston rod bore with the first-named cavity; compressible and incompressible fluids in the first-named cavity and the piston rod bore; and a compressible fluid in the second cavity.

5. In a tractor-trailer coupling: a cylinder assembly including a cylinder having an internal bore defining a path for reciprocation of a piston, and a head closing one end of the bore; a piston assembly in the cylinder bore including a solid piston rod having an external surface parallel to the direction of reciprocation and a bore in one end, a cap secured to said one end forming a closure for the piston rod bore, means spacing said surface from the cylinder bore to provide a cavity for fluid between the rod and the cylinder bore and to seal said cavity from a second cavity for fluid between the piston assembly and the head, and passage means adjacent the inner end of the piston rod bore providing a direct connection between the piston rod bore and the first-named cavity; compressible and incompressible fluids in the first-named cavity; and a compressible fluid in the second cavity.

References Cited in the file of this patent

UNITED STATES PATENTS

| | | |
|---|---|---|
| 1,296,655 | Gurney | Mar. 11, 1919 |
| 1,404,575 | Brown | Jan. 24, 1922 |
| 1,877,126 | Greer | Sept. 13, 1932 |
| 2,250,134 | Pointer | July 22, 1941 |
| 2,460,725 | Armington | Feb. 1, 1949 |
| 2,523,714 | Nilsson | Sept. 26, 1950 |
| 2,545,833 | Wallace | Mar. 20, 1951 |
| 2,608,262 | Sauer | Aug. 26, 1952 |
| 2,669,315 | Butterfield | Feb. 16, 1954 |
| 2,833,553 | Mindrum | May 6, 1958 |
| 2,859,978 | Brimhall | Nov. 11, 1958 |
| 2,865,652 | Easton | Dec. 23, 1958 |

OTHER REFERENCES

Publication "Design News," June 1, 1953, vol. 8, No. 11, pages 10, 11.